US011429725B1

(12) United States Patent
Banerjee

(10) Patent No.: US 11,429,725 B1
(45) Date of Patent: Aug. 30, 2022

(54) AUTOMATED SECURITY RISK ASSESSMENT SYSTEMS AND METHODS

(71) Applicant: Citicorp Credit Services, Inc. (USA), Long Island City, NY (US)

(72) Inventor: Ganesh Banerjee, Mason, OH (US)

(73) Assignee: CITICORP CREDIT SERVICES, INC. (USA), Long Island City, NY (US)

( * ) Notice: Subject to any disclaimer, the term of this patent is extended or adjusted under 35 U.S.C. 154(b) by 300 days.

(21) Appl. No.: 15/963,760

(22) Filed: Apr. 26, 2018

(51) Int. Cl.
  *G06F 21/57* (2013.01)
  *G06Q 20/10* (2012.01)
  *G06N 20/00* (2019.01)

(52) U.S. Cl.
  CPC .......... *G06F 21/577* (2013.01); *G06N 20/00* (2019.01); *G06Q 20/1085* (2013.01); *G06F 2221/034* (2013.01)

(58) Field of Classification Search
  CPC . G06F 21/577; G06F 2221/034; G06N 20/00; G06Q 20/1085
  See application file for complete search history.

(56) References Cited

U.S. PATENT DOCUMENTS

| | | | | |
|---|---|---|---|---|
| 5,485,409 A * | 1/1996 | Gupta | ................... | G06F 21/577 713/164 |
| 5,949,045 A * | 9/1999 | Ezawa | ................... | G06Q 20/20 235/379 |
| 6,349,290 B1 * | 2/2002 | Horowitz | ............. | G06Q 20/108 705/35 |
| 6,370,547 B1 * | 4/2002 | Eftink | .................... | G06Q 10/06 |
| 6,850,252 B1 * | 2/2005 | Hoffberg | ............ | G06K 9/00369 348/E7.061 |
| 6,957,348 B1 * | 10/2005 | Flowers | ................. | G06F 21/552 370/229 |
| 7,591,413 B1 * | 9/2009 | Block | ..................... | G07F 19/20 235/379 |

(Continued)

OTHER PUBLICATIONS

Klerx, T., Anderka, M., Kleine Büning, H., Priesterjahn, S.: Model-based anomaly detection for discrete event systems. In: Proceedings of the 26th IEEE International Conference on Tools with Artificial Intelligence (ICTAI 2014). pp. 665-672. IEEE (2014) (Year: 2014).*

*Primary Examiner* — Jeffrey D. Popham
(74) *Attorney, Agent, or Firm* — Johnson, Marcou, Isaacs & Nix, LLC; George Marcou; Scott A. Hendrix

(57) ABSTRACT

Systems and methods involve a database function of an ATM processor on which rules database records for positive transition flows of ATM hardware or software activities are stored, a security agent function of the ATM processor that extracts data points from a transition flow for every succeeding ATM activity, and an algorithm function of the ATM processor that generates a rules database record for the transition flows for succeeding ATM activity based on the extracted data points and discards any generated rules database record that is identical to a rules database record already stored on the rules database function. A discovery phase of the algorithm function stores new rules database records, rules database function, and a protection phase of the algorithm function selects a risk protocol, when a generated record is not identical to a record already stored.

24 Claims, 8 Drawing Sheets

(56) References Cited

U.S. PATENT DOCUMENTS

| | | | | |
|---|---|---|---|---|
| 7,861,924 B1* | 1/2011 | Block | | G07F 19/20 235/379 |
| 7,866,544 B1* | 1/2011 | Block | | G06Q 20/3224 235/379 |
| 8,346,563 B1* | 1/2013 | Hjelm | | G10L 15/1822 379/88.01 |
| 8,346,729 B2* | 1/2013 | Brannon | | G06Q 10/06 707/661 |
| 8,437,528 B1* | 5/2013 | Csulits | | G07D 7/04 382/135 |
| 8,560,475 B2* | 10/2013 | Hussain | | G06F 9/4498 706/45 |
| 8,577,817 B1* | 11/2013 | Keralapura | | G06N 20/00 706/13 |
| 8,607,351 B1* | 12/2013 | Wang | | G06F 21/577 726/22 |
| 8,800,866 B1* | 8/2014 | Gromley | | G07F 19/209 235/375 |
| 9,004,353 B1* | 4/2015 | Block | | G06Q 20/1085 235/379 |
| 9,129,219 B1* | 9/2015 | Robertson | | G06N 5/048 |
| 9,355,530 B1* | 5/2016 | Block | | G06Q 20/1085 |
| 9,432,378 B1* | 8/2016 | Svigals | | H04L 63/10 |
| 9,454,659 B1* | 9/2016 | Daymont | | G06F 21/566 |
| 9,516,010 B1* | 12/2016 | Avital | | H04L 63/083 |
| 10,216,927 B1* | 2/2019 | Steinberg | | G06F 9/45558 |
| 10,296,848 B1* | 5/2019 | Mars | | G06K 9/6256 |
| 10,311,646 B1* | 6/2019 | Wurmfeld | | G06K 9/00208 |
| 10,360,482 B1* | 7/2019 | Khare | | G06K 9/6227 |
| 10,395,029 B1* | 8/2019 | Steinberg | | G06F 21/554 |
| 10,395,199 B1* | 8/2019 | Gibson | | G06Q 20/18 |
| 10,452,523 B1* | 10/2019 | Vijayalekshmi | | G06F 11/3664 |
| 10,467,615 B1* | 11/2019 | Omojola | | G06Q 20/322 |
| 10,572,821 B1* | 2/2020 | Gauf | | G06F 9/4881 |
| 10,579,753 B2* | 3/2020 | Gould | | G06F 16/24565 |
| 10,608,911 B2* | 3/2020 | Nickolov | | G06F 8/65 |
| 2003/0050885 A1* | 3/2003 | Cohen | | G06Q 50/188 705/37 |
| 2003/0177047 A1* | 9/2003 | Buckley | | G06N 5/02 706/46 |
| 2003/0233155 A1* | 12/2003 | Slemmer | | G05B 15/02 700/13 |
| 2004/0139176 A1* | 7/2004 | Farrell | | H04L 67/06 709/220 |
| 2004/0148586 A1* | 7/2004 | Gilboa | | G06F 8/38 717/108 |
| 2004/0268338 A1* | 12/2004 | Gurpinar | | G06Q 10/06 717/169 |
| 2005/0097320 A1* | 5/2005 | Golan | | G06F 21/40 713/166 |
| 2005/0111460 A1* | 5/2005 | Sahita | | H04L 63/0254 370/395.3 |
| 2005/0118996 A1* | 6/2005 | Lee | | G06F 3/011 455/425 |
| 2005/0143138 A1* | 6/2005 | Lee | | G06F 3/011 455/566 |
| 2005/0222810 A1* | 10/2005 | Buford | | H04L 41/0631 702/183 |
| 2005/0222811 A1* | 10/2005 | Jakobson | | H04L 41/0631 702/183 |
| 2005/0229246 A1* | 10/2005 | Rajagopal | | H04L 63/0236 726/14 |
| 2006/0131408 A1* | 6/2006 | McNamara | | G07F 19/20 235/440 |
| 2006/0218161 A1* | 9/2006 | Zhang | | G06F 40/14 |
| 2008/0091978 A1* | 4/2008 | Brodsky | | G06F 11/3466 714/38.14 |
| 2008/0110982 A1* | 5/2008 | Song | | G06Q 30/04 235/381 |
| 2009/0002332 A1* | 1/2009 | Park | | G06F 3/0488 345/173 |
| 2009/0024549 A1* | 1/2009 | Johnson | | H04L 41/12 706/46 |
| 2009/0057395 A1* | 3/2009 | He | | G06K 9/6278 235/379 |
| 2009/0089078 A1* | 4/2009 | Bursey | | G06F 16/29 705/300 |
| 2009/0199053 A1* | 8/2009 | Neilan | | G07F 19/20 714/57 |
| 2009/0228474 A1* | 9/2009 | Chiu | | G06F 16/958 |
| 2009/0276368 A1* | 11/2009 | Martin | | G06Q 40/02 705/36 R |
| 2012/0017280 A1* | 1/2012 | Wiegenstein | | G06F 21/577 726/25 |
| 2012/0023022 A1* | 1/2012 | Carroll | | G06Q 20/3229 705/44 |
| 2012/0179421 A1* | 7/2012 | Dasgupta | | G05B 23/0281 702/181 |
| 2012/0240185 A1* | 9/2012 | Kapoor | | H04L 41/0866 726/1 |
| 2012/0317058 A1* | 12/2012 | Abhulimen | | G06N 20/00 706/2 |
| 2013/0018788 A1* | 1/2013 | Johnson | | G07F 19/201 705/43 |
| 2013/0019018 A1* | 1/2013 | Rice | | H04L 12/66 709/226 |
| 2013/0024942 A1* | 1/2013 | Wiegenstein | | G06Q 40/00 726/25 |
| 2013/0097706 A1* | 4/2013 | Titonis | | H04W 12/12 726/24 |
| 2013/0103622 A1* | 4/2013 | Matsuoka | | H04L 12/2825 706/12 |
| 2013/0268260 A1* | 10/2013 | Lundberg | | G06F 40/40 704/8 |
| 2013/0274928 A1* | 10/2013 | Matsuoka | | G05B 19/042 700/276 |
| 2014/0006335 A1* | 1/2014 | Hohndel | | G06F 11/3452 706/52 |
| 2014/0006599 A1* | 1/2014 | Hohndel | | G06F 11/3452 709/224 |
| 2014/0006623 A1* | 1/2014 | Hohndel | | G06F 11/3055 709/226 |
| 2014/0058943 A1* | 2/2014 | Glencross | | G07F 19/206 705/43 |
| 2014/0081858 A1* | 3/2014 | Block | | G07F 19/207 705/43 |
| 2014/0090090 A1* | 3/2014 | Vasireddy | | G06F 21/577 726/30 |
| 2014/0101756 A1* | 4/2014 | Tripp | | G06F 21/54 726/22 |
| 2014/0121830 A1* | 5/2014 | Gromley | | G07F 9/026 700/236 |
| 2014/0201838 A1* | 7/2014 | Varsanyi | | G06F 21/552 726/23 |
| 2014/0207674 A1* | 7/2014 | Schroeder | | G06Q 20/4016 705/43 |
| 2014/0236119 A1* | 8/2014 | Tsoukalis | | A61M 5/16854 604/506 |
| 2014/0283076 A1* | 9/2014 | Muttik | | G06F 21/56 726/24 |
| 2014/0344939 A1* | 11/2014 | Tripp | | G06F 21/563 726/25 |
| 2014/0365301 A1* | 12/2014 | Rappoport | | G06Q 30/0253 705/14.51 |
| 2014/0372348 A1* | 12/2014 | Lehmann | | G06N 5/04 706/12 |
| 2015/0058215 A1* | 2/2015 | Johnson | | G06Q 20/1085 705/43 |
| 2015/0068863 A1* | 3/2015 | Blower | | G07D 11/22 194/202 |
| 2015/0242626 A1* | 8/2015 | Wang | | G06F 21/561 726/23 |
| 2015/0249663 A1* | 9/2015 | Svigals | | H04L 63/0853 726/7 |
| 2015/0254496 A1* | 9/2015 | Nada | | G06K 9/00067 382/124 |

(56) References Cited

U.S. PATENT DOCUMENTS

| | | | | |
|---|---|---|---|---|
| 2015/0332053 A1* | 11/2015 | Bhattacharya | G06F 21/577 726/25 |
| 2015/0339376 A1* | 11/2015 | Wieweg | G06N 20/00 707/739 |
| 2016/0004566 A1* | 1/2016 | Kuchiwaki | G06F 9/4881 718/100 |
| 2016/0065592 A1* | 3/2016 | Svigals | H04L 9/3228 726/3 |
| 2016/0071017 A1* | 3/2016 | Adjaoute | G06Q 20/4016 706/52 |
| 2016/0260033 A1* | 9/2016 | Keyngnaert | G06Q 10/063 |
| 2016/0269247 A1* | 9/2016 | Chakradhar | H04L 45/02 |
| 2016/0275760 A1* | 9/2016 | Block | G06Q 20/3223 |
| 2016/0283715 A1* | 9/2016 | Duke | G06N 20/00 |
| 2016/0314468 A1* | 10/2016 | Smith | G06Q 20/1085 |
| 2016/0371489 A1* | 12/2016 | Puri | H04L 63/1425 |
| 2016/0379137 A1* | 12/2016 | Burger | G06F 9/46 706/12 |
| 2017/0017789 A1* | 1/2017 | Daymont | G06F 11/362 |
| 2017/0034023 A1* | 2/2017 | Nickolov | H04L 43/0817 |
| 2017/0090666 A1* | 3/2017 | Pahud | G06F 3/04842 |
| 2017/0091450 A1* | 3/2017 | Turgeman | G06F 21/554 |
| 2017/0093897 A1* | 3/2017 | Cochin | G06F 21/566 |
| 2017/0109509 A1* | 4/2017 | Baghdasaryan | H04L 63/08 |
| 2017/0177808 A1* | 6/2017 | Irwin | G06F 19/328 |
| 2017/0177809 A1* | 6/2017 | Bull | G06F 16/24578 |
| 2017/0178093 A1* | 6/2017 | Bull | G06Q 40/02 |
| 2017/0178135 A1* | 6/2017 | Bull | G06Q 10/1057 |
| 2017/0178245 A1* | 6/2017 | Rodkey | G06Q 30/0202 |
| 2017/0316324 A1* | 11/2017 | Barrett | G06T 19/006 |
| 2017/0316407 A1* | 11/2017 | Lazaro | G09B 7/08 |
| 2017/0330267 A1* | 11/2017 | Cahall, Jr | A61B 1/00179 |
| 2017/0337542 A1* | 11/2017 | Kim | G06N 3/0454 |
| 2017/0346851 A1* | 11/2017 | Drake | B60K 6/48 |
| 2017/0365305 A1* | 12/2017 | Chang | G01N 33/57419 |
| 2017/0372056 A1* | 12/2017 | Narasimhan | H01L 51/5016 |
| 2018/0004937 A1* | 1/2018 | Shannon | G06F 3/0481 |
| 2018/0025161 A1* | 1/2018 | Gauthier | B29C 45/766 |
| 2018/0025270 A1* | 1/2018 | John | B41K 1/40 |
| 2018/0025336 A1* | 1/2018 | Block | G07F 19/20 705/43 |
| 2018/0035886 A1* | 2/2018 | Courtemanche | H01R 13/5205 |
| 2018/0039911 A1* | 2/2018 | Bezzubtseva | E21B 29/00 |
| 2018/0132307 A1* | 5/2018 | Almeida Neves | H04L 65/102 |
| 2018/0165598 A1* | 6/2018 | Saxena | G06N 3/006 |
| 2018/0165758 A1* | 6/2018 | Saxena | G06Q 20/405 |
| 2018/0189485 A1* | 7/2018 | Jain | G06F 21/556 |
| 2018/0203833 A1* | 7/2018 | Liang | G06F 40/30 |
| 2018/0240026 A1* | 8/2018 | Pietrobon | G08G 1/0112 |
| 2018/0246705 A1* | 8/2018 | Spiegel | G06F 8/38 |
| 2018/0270260 A1* | 9/2018 | Govardhan | G06N 20/00 |
| 2018/0276710 A1* | 9/2018 | Tietzen | G06N 3/08 |
| 2018/0285176 A1* | 10/2018 | Mozhaev | G06N 20/00 |
| 2018/0285248 A1* | 10/2018 | Gupta | G06F 11/3684 |
| 2018/0285745 A1* | 10/2018 | Lu | G06F 21/566 |
| 2018/0308022 A1* | 10/2018 | Philips | G06Q 10/0633 |
| 2018/0349508 A1* | 12/2018 | Bequet | G06F 16/90344 |
| 2018/0373245 A1* | 12/2018 | Nishi | G08G 1/167 |
| 2019/0004890 A1* | 1/2019 | Venkataraman | G06Q 10/063 |
| 2019/0012672 A1* | 1/2019 | Francesco | G06Q 20/3825 |
| 2019/0018937 A1* | 1/2019 | Jadhav | G06N 20/00 |
| 2019/0020668 A1* | 1/2019 | Sadaghiani | G06F 16/285 |
| 2019/0036858 A1* | 1/2019 | Kovega | H04L 51/12 |
| 2019/0042425 A1* | 2/2019 | Shifer | G06F 12/0831 |
| 2019/0042900 A1* | 2/2019 | Smith | G06K 9/6228 |
| 2019/0044818 A1* | 2/2019 | Nolan | H04W 8/005 |
| 2019/0050322 A1* | 2/2019 | Bhojan | G06F 11/3684 |
| 2019/0066694 A1* | 2/2019 | Hirzel | G10L 15/22 |
| 2019/0095888 A1* | 3/2019 | Monaghan | G06N 7/005 |
| 2019/0102078 A1* | 4/2019 | Bhatt | G06F 3/04847 |
| 2019/0102686 A1* | 4/2019 | Yang | G06N 20/00 |
| 2019/0116136 A1* | 4/2019 | Baudart | H04L 63/1433 |
| 2019/0122140 A1* | 4/2019 | Sen | G06N 3/088 |
| 2019/0138879 A1* | 5/2019 | Hu | G06F 16/9027 |
| 2019/0138942 A1* | 5/2019 | Raskovalov | G06N 5/046 |
| 2019/0140939 A1* | 5/2019 | Schooler | H04L 69/04 |
| 2019/0155941 A1* | 5/2019 | Bhide | G06N 5/046 |
| 2019/0164388 A1* | 5/2019 | Ozasa | G07F 19/21 |
| 2019/0166153 A1* | 5/2019 | Steele | G06N 20/00 |
| 2019/0205238 A1* | 7/2019 | Lemay | G06F 21/56 |
| 2019/0207953 A1* | 7/2019 | Klawe | G06Q 20/202 |
| 2019/0236362 A1* | 8/2019 | Srivastava | G06Q 20/208 |
| 2019/0243933 A1* | 8/2019 | Roemerman | G06N 20/00 |
| 2019/0286564 A1* | 9/2019 | Chauhan | G06F 16/23 |
| 2019/0286901 A1* | 9/2019 | Blanco | G06K 9/00536 |
| 2019/0287168 A1* | 9/2019 | Williams, III | G06Q 40/02 |
| 2019/0289025 A1* | 9/2019 | Kursun | H04L 41/147 |
| 2019/0297007 A1* | 9/2019 | Lessmann | H04L 45/38 |
| 2019/0306023 A1* | 10/2019 | Vasseur | G06N 5/04 |
| 2019/0312791 A1* | 10/2019 | Ligata | G06N 20/00 |
| 2019/0325448 A1* | 10/2019 | Barakat | G06Q 20/407 |
| 2019/0347125 A1* | 11/2019 | Sankaran | G06F 9/3017 |
| 2019/0349426 A1* | 11/2019 | Smith | H04L 67/104 |
| 2020/0004710 A1* | 1/2020 | Peter | G06F 16/252 |
| 2020/0012955 A1* | 1/2020 | Miyata | G06N 5/04 |
| 2020/0034112 A1* | 1/2020 | Woo | G06N 20/00 |
| 2020/0057856 A1* | 2/2020 | Daymont | G06F 11/3668 |

* cited by examiner

| 202 | 204 | 206 | 208 |
|---|---|---|---|
| Current State | Next State | Network Available | Positive Host Response |
| PIN Entered | Select Transaction | Yes | Yes |

FIG. 2

| 302 | 304 | 306 | 308 | 310 | 312 | 314 | 316 |
|---|---|---|---|---|---|---|---|
| Current State | Next State | Network Available | Customer Request Amount | Positive Host Response | Bank Host Authorized Amount | Cash Counter Previous State | Cash Counter Current State |
| Cash Counted | Present Cash | Yes | 200 | Yes | 200 | 10-10, 20-10, 50-20, 100-30 | 10-10, 20-10, 50-20, 100-28 |

FIG. 3

| Current State 402 | Next State 404 | Network Available 406 | Is Cash Counter Invoked 408 | Customer Request Amount | Positive Host Response | Bank Host Authorized Amount | Cash Counter Previous State | Cash Counter Current State |
|---|---|---|---|---|---|---|---|---|
| PIN Entered | Select Transaction | Yes | No | | | | | |

| Current State 410 | Next State 412 | Network Available 414 | Is Cash Counter Invoked 416 | Customer Request Amount 418 | Positive Host Response 420 | Bank Host Authorized Amount 422 | Cash Counter Previous State 424 | Cash Counter Current State 426 |
|---|---|---|---|---|---|---|---|---|
| Cash Counted | Present Cash | Yes | Yes | 200 | Yes | 200 | 10-10, 20-10, 50-20, 100-30 | 10-10, 20-10, 50-20, 100-28 |

FIG. 4

AUTOMATED SECURITY RISK ASSESSMENT SYSTEMS AND METHODS

FIELD OF THE INVENTION

The present invention relates generally to the field of automated risk assessment, and more particularly to automated systems and methods for security risk assessment.

BACKGROUND OF THE INVENTION

Security in automated teller machines (ATMs) is currently either proactive or reactive. In either case, an ATM does not have the resources to protect itself, must depend on a set of static rules, and is devoid of any means to confuse or combat the thinking of an individual who attacks the ATM. There is currently no way for such an ATM to understand that it has a security issue. Nor is there currently a way to enable an ATM to learn from its security-related mistakes and assure that those same mistakes are not repeated. Software applications currently offered, as solutions in terms of ATM security generally require a substantial amount of memory and/or other resources to be available to an ATM. Thus, such legacy offerings are not feasible for ATM security solutions involving self-learning.

There is a present need for systems and methods that employ machine learning to enable the ATM itself to decide whether its security is under threat and to learn to fight such threat in real time using means made available to the ATM when the threat arises. The problem solved by embodiments of the invention is rooted in technical limitations of the legacy approaches, and improved technology is needed to address these problems. More specifically, the aforementioned legacy approaches fail to achieve the sought-after capabilities of the herein disclosed automated security risk assessment systems and methods.

SUMMARY OF THE INVENTION

Embodiments of the invention advance technical fields for addressing problems associated with the above-described legacy manual processes for automated security risk assessment as well as advancing peripheral technical fields. Such embodiments of the invention employ computer hardware and software, including, without limitation, one or more processors coupled to memory and non-transitory computer-readable storage media with one or more executable programs stored thereon which instruct the processors to perform the automated fraud risk assessment described herein.

Embodiments of the invention are directed to technological solutions that may involve automated systems that may employ, for example, a rules database function of an automated teller machine (ATM) processor storing a rules database record for only a single instance of a positive transition flow from a current state to an ensuing state for each of a plurality of ATM hardware or software activities initiated by the ATM processor; a security agent function of the ATM processor that extracts data points from a transition flow from a current state to an ensuing state for every succeeding ATM hardware or software activity initiated by the ATM processor; and an algorithm function of the ATM processor that generates a rules database record for the transition flow from the current state to the ensuing state for every succeeding ATM hardware or software activity initiated by the ATM processor based on said extracted data points, and discards said generated rules database record when said generated rules database record is identical to a rules database record already stored on the rules database function of the ATM processor.

In other aspects of embodiments of the invention, the rules database function of the ATM processor may be, for example, a document database function of the ATM processor. In still other aspects, the rules database function of the ATM processor stores the rules database record for only the single instance of positive transition flow from the current state to the ensuing state as a state transition rule record for each of the plurality of ATM hardware or software activities initiated by the ATM processor. In additional aspects, for example, the rules database function of the ATM processor may store the database record as a state transition rule record in a whitelist of safe ATM transition states for each of the plurality of ATM hardware or software activities initiated by the ATM processor.

In further embodiments of the invention, for example, the security agent function of the ATM processor may extract data points from the transition flow from the current state to the ensuing state for every succeeding ATM hardware or software activity initiated by the ATM processor based on a data points template. In still further aspects, for example, the security agent function of the ATM processor may output the extracted data points as an input to the algorithm function of the ATM processor. In additional aspects, for example, the algorithm function of the ATM processor may receive the extracted data points from the security agent function of the ATM and format and analyze the extracted data points for data integrity. In other aspects, for example, the algorithm function of the ATM processor may receive the extracted data points from the security agent function of the ATM and format and analyze the extracted data points for data integrity based on a model template for logical correctness of the extracted data.

In still further aspects of embodiments of the invention, the algorithm function of the ATM processor may be, for example, a discovery phase algorithm function of the ATM processor that generates the database record for the transition flow from the current state to the ensuing state for every succeeding ATM hardware or software activity initiated by the ATM processor based on said extracted data points, and outputs said generated database record as a new rules database record when said generated database record is not identical to a rules database record already stored by the rules database function of the ATM processor. In other aspects, for example, the discovery phase algorithm function of the ATM processor may generate the rules database record for the transition flow from the current state to the ensuing state for every succeeding ATM hardware or software activity initiated by the ATM processor based on said extracted data points, and store the generated rules database record as a new rules database record on the rules database function of the ATM processor when the generated rules database record is not identical to a rules database record already stored by the database function of the ATM processor.

In additional aspects of embodiments of the invention, the algorithm function of the ATM processor may be, for example, a protection phase algorithm function of the ATM processor that generates the rules database record for the transition flow from the current state to the ensuing state for every succeeding ATM hardware or software activity initiated by the ATM processor based on said extracted data points, and sends a negative transition response to the security agent function of the ATM processor when the generated rules database record is not identical to a rules database record already stored by the rules database function of the ATM processor. In other aspects, the protection phase algorithm function of the ATM processor may generate the rules database record for the transition flow from the current state to the ensuing state for every succeeding ATM hardware or software activity initiated by the ATM processor based on the extracted data points, and select a security risk mitigation protocol when the generated rules database record is not identical to a rules database record already stored by the rules database function of the ATM processor.

Embodiments of the invention may also provide methods involving, for example, storing, by a rules database function of an automated teller machine (ATM) processor, a rules database record for only a single instance of a positive transition flow from a current state to an ensuing state for each of a plurality of ATM hardware or software activities initiated by the ATM processor; extracting, by a security agent function of the ATM processor, data points from a transition flow from a current state to an ensuing state for every succeeding ATM hardware or software activity initiated by the ATM processor; and generating, by an algorithm function of the ATM processor, a rules database record for the transition flow from the current state to the ensuing state for every succeeding ATM hardware or software activity initiated by the ATM processor based on said extracted data points, and discarding, by the algorithm function of the ATM processor, said generated rules database record when said generated rules database record is identical to a rules database record already stored on the rules database function of the ATM processor.

Other aspects of the method for embodiments of the invention may involve, for example, storing the rules database record by a document database function of the ATM processor. In still other aspects, storing the rules database record by the database function of the ATM processor may involve, for example, storing the rules database record for only the single instance of positive transition flow from the current state to the ensuing state as a state transition rule record for each of the plurality of ATM hardware or software activities initiated by the ATM processor. In additional aspects, storing the rules database record by the database function of the ATM processor may involve, for example, storing the database record as the state transition rule record in a whitelist of safe ATM transition states for each of the plurality of ATM hardware or software activities initiated by the ATM processor.

In further aspects of embodiments of the invention, extracting data points from the transition flow by the security agent function of the ATM processor may involve, for example, extracting the data points from the transition flow from the current state to the ensuing state for every succeeding ATM hardware or software activity initiated by the ATM processor based on a data points template. In still further aspects, extracting data points from the transition flow by the security agent function of the ATM processor may involve, for example, outputting the extracted data points as an input to the algorithm function of the ATM processor.

In additional aspects of embodiments of the invention, generating the rules database record by the algorithm function of the ATM processor may involve, for example, receiving the extracted data points from the security agent function of the ATM, and formatting and analyzing the extracted data points for data integrity. In other aspects, formatting and analyzing the extracted data points may involve, for example, formatting and analyzing the extracted data points for data integrity based on a model template for logical correctness of the extracted data.

In still further aspects of embodiments of the invention, generating the rules database record by the algorithm function of the ATM processor may involve, for example, generating, by a discovery phase algorithm function of the ATM processor, the rules database record for the transition flow from the current state to the ensuing state for every succeeding ATM hardware or software activity initiated by the ATM processor based on said extracted data points, and outputting, by the discovery phase algorithm function of the ATM processor, the generated rules database record as a new rules database record when the generated database record is not identical to a rules database record already stored by the rules database function of the ATM processor. In other aspects, outputting the generated rules database record as a new rules database record by the discovery phase algorithm function of the ATM processor may involve, for example, storing the new rules database record on the rules database function of the ATM processor when the generated rules database record is not identical to a rules database record already stored by the database function of the ATM processor.

In still other aspects of embodiments of the invention, generating the rules database record by the algorithm function of the ATM processor may involve, for example, generating, by a protection phase algorithm function of the ATM processor, the rules database record for the transition flow from the current state to the ensuing state for every succeeding ATM hardware or software activity initiated by the ATM processor based on said extracted data points, and sending, by the protection phase algorithm function of the ATM processor, a negative transition response to the security agent function of the ATM processor when the generated rules database record is not identical to a rules database record already stored by the rules database function of the ATM processor. In additional aspects, generating the rules database record by the protection phase algorithm function of the ATM processor may involve, for example, generating the rules database record for the transition flow from the current state to the ensuing state for every succeeding ATM hardware or software activity initiated by the ATM processor based on the extracted data points, and selecting a security risk mitigation protocol when the generated rules database record is not identical to a rules database record already stored by the rules database function of the ATM processor.

These and other aspects of the invention will be set forth in part in the description which follows and in part will become more apparent to those skilled in the art upon examination of the following or may be learned from practice of the invention. It is intended that all such aspects are to be included within this description, are to be within the scope of the present invention, and are to be protected by the accompanying claims.

BRIEF DESCRIPTION OF THE DRAWINGS

FIG. 2 is a table that illustrates an example of data points relevant to an ensuing state that may be employed in instructions for an ATM to self-learn in order to protect itself in embodiments of the invention;

FIG. 3 is a table that illustrates another example of data points relevant to each ensuing state employed in instructions for the ATM to self-learn in order to protect itself in embodiments of the invention;

FIG. 4 illustrates an example of a single data point set consistent with the example states shown in FIGS. 2 and 3 that may be captured by an ATM for embodiments of the invention;

DETAILED DESCRIPTION

Figure 1A:
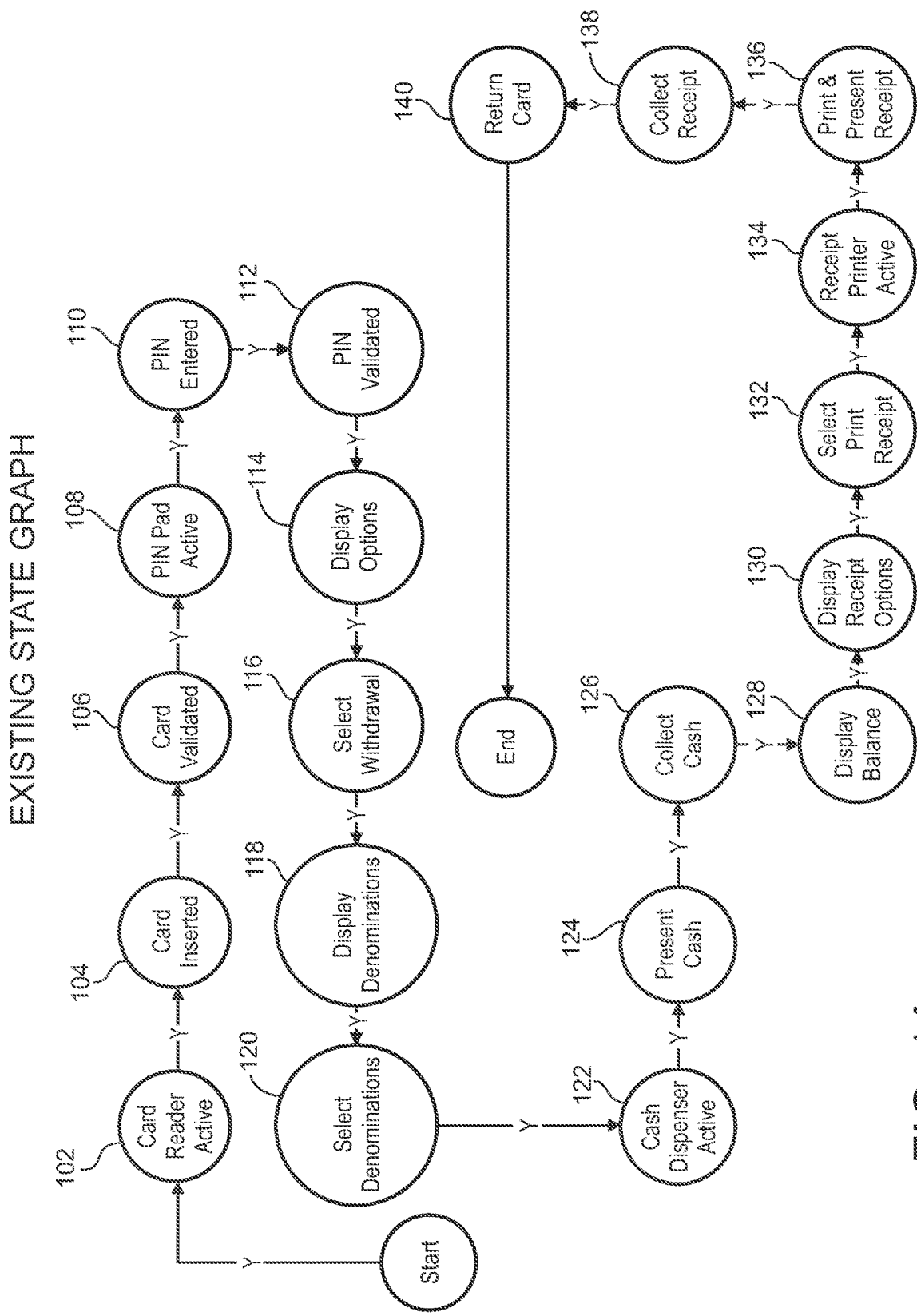
FIG. 1A illustrates an example an existing state graph in a process for embodiments of the invention.

Reference will now be made in detail to embodiments of the invention, one or more examples of which are illustrated in the accompanying drawings. Each example is provided by way of explanation of the invention, not as a limitation of the invention. It will be apparent to those skilled in the art that various modifications and variations can be made in the present invention without departing from the scope or spirit of the invention. For example, features illustrated or described as part of one embodiment can be used in another embodiment to yield a still further embodiment. Thus, it is intended that the present invention cover such modifications and variations that come within the scope of the invention.

Embodiments of the invention provide systems and methods for an ATM to self-learn to determine when its security is under threat and to learn to fight such threat in real time. Thus, embodiments of the invention may focus, for example, on providing an ATM with an ability to learn from mistakes that may threaten its security and to proceed without repeating such mistakes. A further focus of embodiments of the invention may be to enable the ATM to self-learn with a small memory footprint in the ATM.

An ATM is essentially a computer system with a central processing unit (CPU) and memory and may be in various states that may be invoked by a hardware event or a software event. For example, reading a user's card by an ATM card reader may be a hardware event, and communicating the user's ATM transaction to a backend host server may be a software event. There is currently no ATM technology available that handles both hardware and software events and also learns what effect hardware and software events may have on an ATM.

In embodiments of the invention, a state in an ATM may be defined as any instance that has an input and an output. For example, debit/credit card recognition may be a state, wherein the input may be a card number and the output may be a type of card, such as a MASTERCARD or VISA or an on-us card (i.e. acquirer and issuer are the same) or off-us card (i.e. acquirer and issuer are different). A state may be an individual state or a combination of states.

The ATM may possess a graphical threat model for embodiments of the invention of all known ATM states. The output of a state may be an input to another state or it may be a final outcome. This allows a definition of a new term called "path" (collection of edges) for an entire financial or non-financial transaction in the ATM.

In embodiments of the invention, whether a path or edge contributes positively or negatively to a transaction flow may be dependent on its impact on the ATM and on a financial institution that deploys the ATM, such as a bank. For example, a user's interaction with a cash dispenser of an ATM may be an action of risk at its highest level since any loss incurred in such interaction may be irreversible. At the same time, an ATM interaction dealing with a check deposit may be at a much lower level of risk as it may be reversed.

Figure 1B:
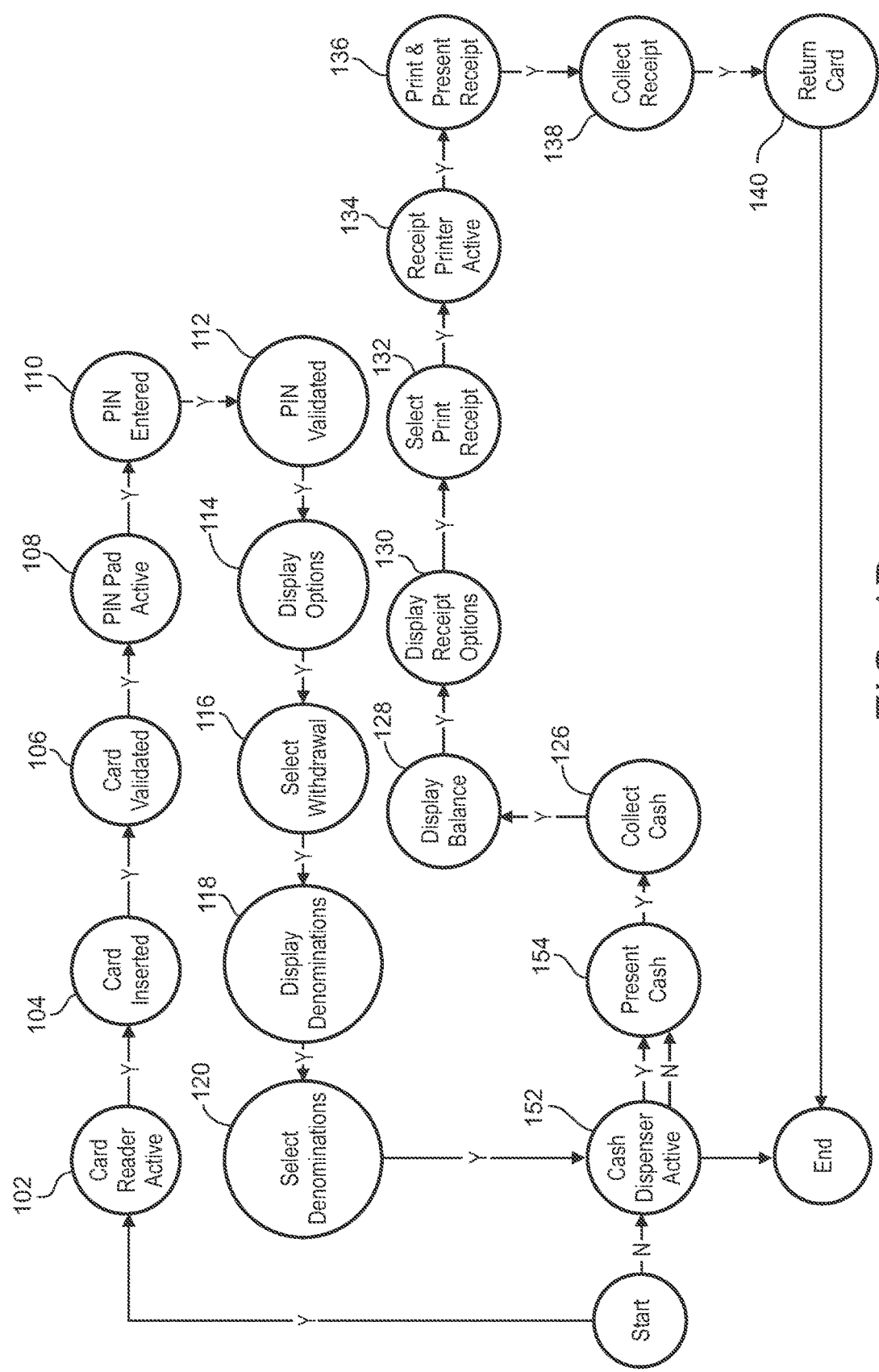
FIG. 1B illustrates an example of an addition of an edge to an existing node in the existing state graph of FIG. 1A in the process for embodiments of the invention.
Figure 1C:
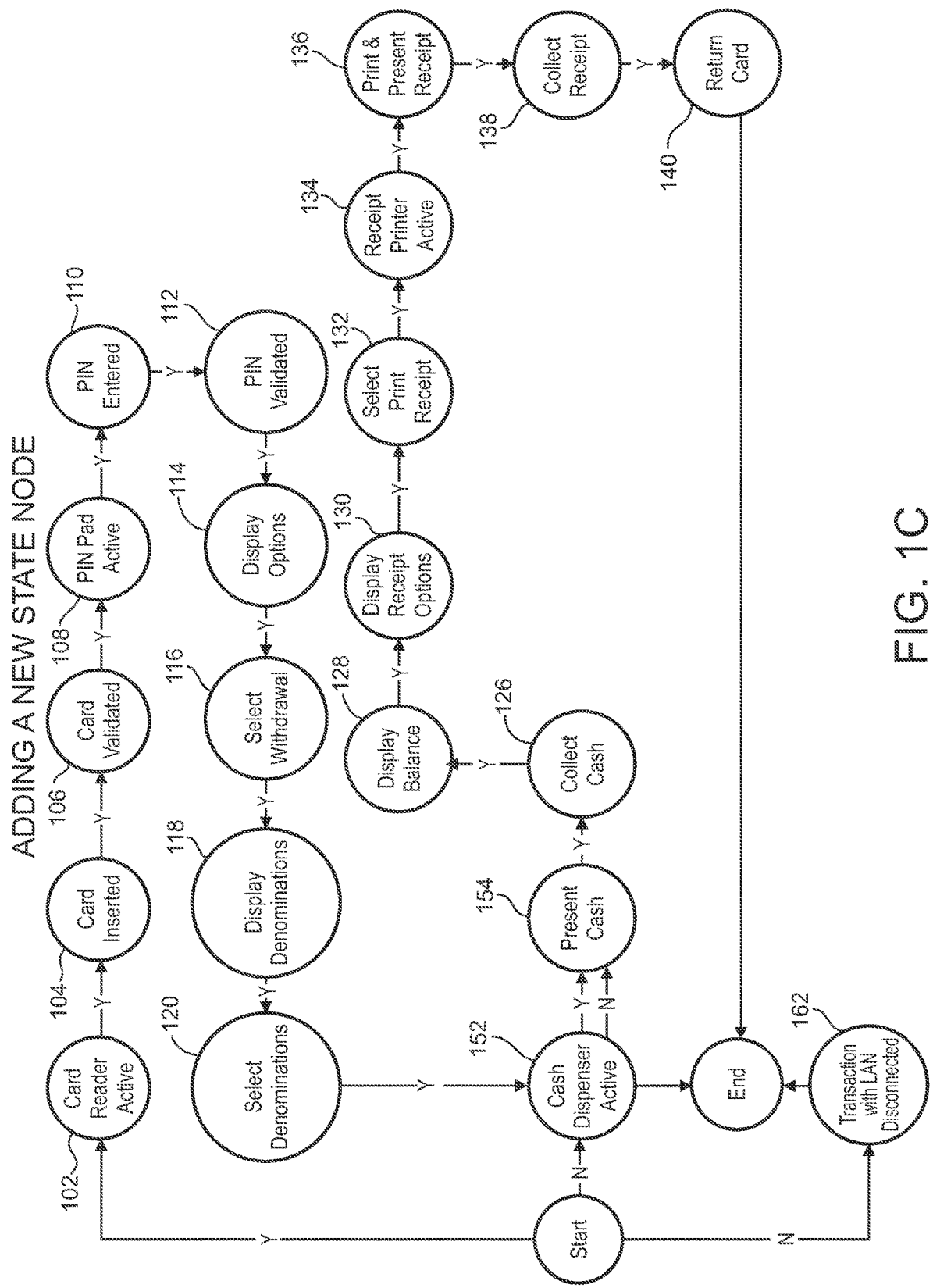
FIG. 1C illustrates an example of an addition of a new state node in the existing state graph of FIG. 1A in the process for embodiments of the invention.

In embodiments of the invention, a path or edge may or may not lead to a threat. An ATM for embodiments of the invention may decide the level of threat by examining the edge to a state node. Each state may be categorized based on a nature of its execution, which provides a unique weight for a state. FIGS. 1A, 1B, and 1C illustrate examples, respectively, of an existing state graph, an addition of an edge to an existing node in the existing state graph, and an addition of a new state node in the existing state graph in a process for embodiments of the invention.

Referring to FIG. 1 A, the normal process of ATM cash withdrawal may involve, for example, activation of the ATM card reader at 102; insertion of a card into the card reader 104; validation of the card 106; activation of an ATM PIN pad 108; entry of a PIN 110; validation of the PIN 112; display of ATM options 114; selection of the withdrawal option 116; display of denomination options 118; selection of denomination 120; activation of the ATM cash dispenser 122; dispensing of the requested cash 124; collection of the cash 126; display of account balance 128; display option to print receipt 130; selection of option to print withdrawal receipt 132; activation of receipt printer 134; printing and presentment of receipt 136; collection of the receipt 138; and return of the card 140.

Referring to FIG. 1 B, an abnormal or negative ATM withdrawal process may involve, for example, forceful activation of the ATM cash dispenser 152, and dispensing of cash 154, for example, by a fraudster. Referring to FIG. 1C, it can be seen that the abnormal or negative ATM withdrawal process of FIG. 1B, may lead to addition of a new state node characterized as a transaction with the network disconnected 162.

From the nature of execution, it may be understood whether a particular state of the ATM was forced or was following its normal course. For example, the ATM cash dispenser may be invoked in different ways, such as a positive case in a normal course as illustrated in FIG. 1A or a negative case in an abnormal course as illustrated in FIGS. 1B and 1C. In the positive case or normal course illustrated in FIG. 1A, a user at may enter a card 104 at the ATM, enter a PIN number 110, choose "cash withdrawal" 116, enter an amount 120, and then withdraw cash 126. The abnormal course or negative case, such as illustrated in FIGS. 1B and 1C may involve forceful invocation 152 using software that simply invokes the ATM cash dispenser to dispense cash 154.

In embodiments of the invention, the ATM may understand that the separation of these positive and negative cases is the nature of their execution or factors governing their execution. Thus, monitoring an overall weight of a transaction may allow an ATM for embodiments of the invention to understand whether or not a transaction is a threat to the ATM, which may affect the final outcome.

Every hardware or software event on an ATM may be considered as a state, and a typical software application running on an ATM may inherently possess a name for each hardware or software state. While not currently employed in any in real world scenario, such feature may be utilized in an ATM security model for embodiments of the invention.

For example, in embodiments of the invention, when the ATM hardware cash dispenser is activated, the ATM is aware of its activation and such hardware action generates an event, which constitutes a state. Another example of a state may be a customer's selection of a correct denomination for dispensing cash. The only difference between such examples is that the former is a hardware event and the latter is a software event.

Embodiments of the invention may provide, for example, a software security agent function, which is aware of all events that occur in the ATM. For example, every event that occurs in the ATM, whether it is a hardware event or a software event, may pass through the software security agent function for embodiments of the invention.

The security agent function for embodiments of the invention may come into play, for example, when the ATM switches from one software/hardware state to another software/hardware state. At such point, the security agent function for embodiments of the invention may decide whether or not an upcoming ATM state is a security risk. In embodiments of the invention, such decision may be based on a set of self-learning rules in a rules database and not be based on hard-coded rules.

For creation of self-learning rules, embodiments of the invention may involve, for example, instructing an ATM as to what the ATM must learn in order to protect itself. Such instructions for embodiments of the invention may be data points relevant to each ensuing state. The same set of instructions may also be used to protect the ATM after the ATM has gained adequate knowledge about itself.

FIG. 2 is a table that illustrates an example of data points relevant to an ensuing state that may be employed in instructions for an ATM to self-learn in order to protect itself in embodiments of the invention. Referring to FIG. 2, a state such as 'Prompt Customer to Select Transaction' may have data points, such as Current State: PIN Entered 202; Next State: Select Transaction 204; Network Available: Yes 206; and Positive Host Response: Yes 208, that may be captured by the ATM for embodiments of the invention.

FIG. 3 is a table that illustrates another example of data points relevant to each ensuing state employed in instructions for the ATM to self-learn in order to protect itself in embodiments of the invention. Referring to FIG. 3 a state such as 'Cash Dispenser-Present Cash' may have data points, such as Current State: Cash Counted 302; Next State: Present Cash 304: Network Available: Yes 306: Customer Request Amount: $200 308: Positive Host Response: Yes 310: Bank Host Authorized Amount: $200 312: Cash Counter Previous State: $10-10, $20-10, $50-20, $100-30 314: and Cash Counter Current State: $10-10, $20-10, $50-20, $100-28 316, that may be captured by the ATM.

Further, both the above states may be taken into account in a single data point set. FIG. 4 illustrates an example of a single data point set taking into account the example states shown in FIGS. 2 and 3 that may be captured by an ATM for embodiments of the invention. Referring to FIG. 4, a single data point set taking into account the example states shown in FIGS. 2 and 3 may include data points, such as Current State: PIN Entered 402; Next State: Select Transaction 404; Network Available: Yes 406; Is Cash Counter Invoked: No 408; Current State: Cash Counted 410; Next State: Present Cash 412; Network Available: Yes 414; Is Cash Counter Invoked: Yes 416; Customer Request Amount: $200 418; Positive Host Response: Yes 420; Bank Host Authorized Amount: $200 422; Cash Counter Previous State: $10-10, $20-10, $50-20, $100-30 424; and Cash Counter Current State: $10-10, $20-10, $50-20, $100-28 426.

The ATM security agent function for embodiments of the invention may collate these data points during a transition from previous to current state and send the data points to an algorithm function. Whether or not to an event will be allowed to occur may depend on the algorithm function for embodiments of the invention.

The algorithm function for embodiments of the invention may enable an ATM to continually self-learn what the ATM does correctly. In a phase of the algorithm function for embodiments of the invention that enables the ATM to learn, also referred to as the algorithm A1 function, no attempt may be made to correct an issue. Thus, in the learning or algorithm A1 phase, the algorithm may allow all events to occur whether or not they raise security issues.

In embodiments of the invention, the ATM has a document database that may communicate, for example, over the ATM network. The document database may continually store records with respect to transitions from one state to another. Assume for example a hardware state in which an individual inserts a card into a card reader of the ATM. When that occurs, the card reader may immediately register a hardware event. If the card is legitimate, the ATM may proceed with a transaction, but if the card is fraudulent, the ATM may reject the transaction.

In the foregoing example, when the card is inserted into the card reader, after reading the card and before proceeding with a transaction, the ATM may display a PIN pad with a prompt for entry of a PIN code that is valid for the particular card. Accordingly, there may be a transition when the card is inserted into the ATM card reader and the card reader generates a hardware event in reading the card, and another transition when the ATM generates a software event in displaying the PIN pad.

There may be a further transition when the PIN code that was entered on the PIN pad is sent to a host server, which is a software event. Thus, it may be seen that the card verification process of the foregoing example represents a set of hardware and software events. Each time the algorithm A1 function for embodiments of the invention receives a transition for an event, it may store the received transition in the document database for embodiments of the invention.

In embodiments of the invention, the phase in which the ATM self-learns about itself may be characterized as a discovery phase. In the discovery phase, data points relevant to a particular ensuing ATM state may be input by the ATM security agent function for embodiments of the invention to the A1 algorithm. The task of the A1 algorithm function for embodiments of the invention may be to wrangle and analyze the data feed from the ATM security agent function and create a corresponding rule in a rules database if such a rule is not already present in the rules database.

It is to be noted that during the discovery phase, the ATM security agent function for embodiments of the invention may not expect a response of any kind from the A1 algorithm function. When it is deemed that the ATM has learned enough and is capable of protecting itself, the mode of operation of the ATM security agent function for embodiments of the invention may be switched from the discovery phase mode to a protection phase mode.

In the protection phase mode, the ATM security agent function for embodiments of the invention may continue to output the same data feed as in the discovery phase, but may send that data feed to a different algorithm, which may be referred to as the A2 algorithm. The task of the algorithm A2 function, may be to wrangle and analyze the data feed from the ATM security agent function and draw inferences from the data feed by running it against entries in the rules database.

Unlike the discovery phase, the ATM security agent function for embodiments of the invention may expect a response from the algorithm A2 function in the protection phase, which may allow the ATM to understand whether it should proceed with a particular upcoming state transition. Consequently, algorithms A1 and A2 for embodiments of the invention may be considered as discovery and protection modes of operation, respectively, of a single algorithm, namely the ATM security algorithm.

In embodiments of the invention, the algorithm AI function may employ a model template in performing a data integrity check of received data, for example, for logical correctness. Assume, for example, that an individual attempts to exceed daily ATM withdrawal limits by accessing a different ATM after the withdrawal limit is reached at a first ATM and a further withdrawal is denied. When that happens, a software event may occur on the backend host that counts the total amount of money withdrawn from one or more ATMs and may reject the ATM transaction that attempts to exceed the daily limit.

In embodiments of the invention, the algorithm AI function may employ the model template in performing a data integrity check for logical correctness and reach a decision that such an attempted ATM withdrawal transaction exceeding the daily limit is not correct. It is possible for an individual to cheat the algorithm A1 function. However, the algorithm function for embodiments of the invention is not a static algorithm. Instead, the algorithm may be dynamically changed based on experience of various kinds of ATM transactions that occur.

The model for embodiments of the invention is a universal model that may enable the ATM to discover whether or not a particular transition from one event to another is a legitimate transition. The model may allow the algorithm function for embodiments of the invention to follow a specific path. For example, the algorithm function may first check the host data and then check a total number of the transactions that were run and are running on the ATM.

Figure 5:
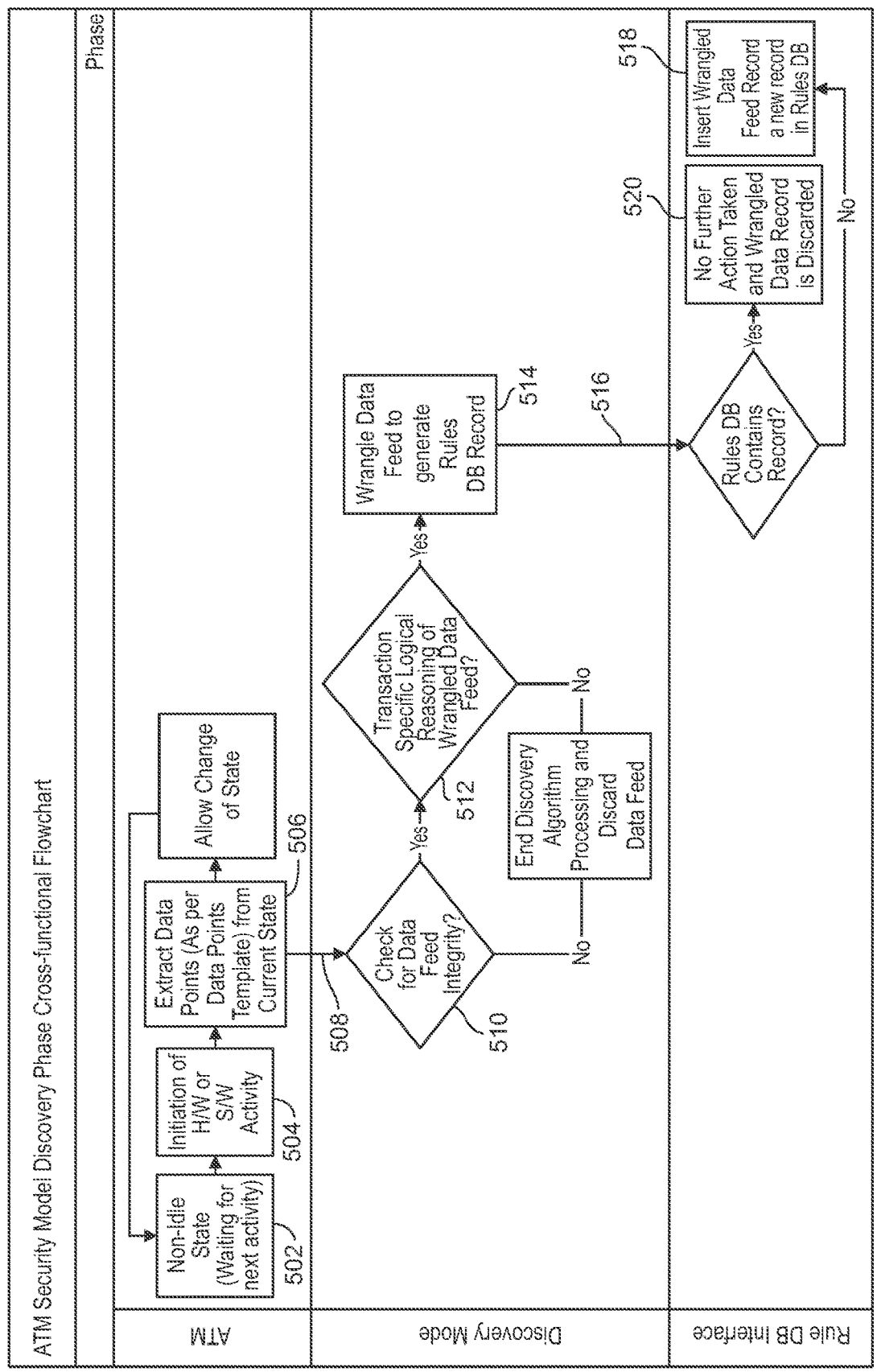
FIG. 5 illustrates a use case example of an ATM model discovery phase cross-functional flow chart for embodiments of the invention.

FIG. 5 illustrates a use case example of an ATM model discovery phase cross-functional flow chart for embodiments of the invention. Referring to FIG. 5, at 502, an ATM may be in a known initial state or start node in which it awaits an occurrence of hardware or software activity for an ATM session, which may be initiated as an ensuing state at 504. At 506, upon encountering hardware or software activity in an ensuing state, the ATM security agent function may extract transaction specific data points from a current state of the session based, for example, on a data points template and feed the data points as input to the A1 algorithm function at 508.

Referring further to FIG. 5, at 510, the A1 algorithm function may check the received data points feed for data integrity; at 512, the A1 algorithm function may check the data points feed for logical correctness; at 514, the A1 algorithm function may wrangle the data feed into a rules database record; and at 516, the A1 algorithm function may query the rules database as to whether or not the record is already present in the database. At 518, if the record is not already present in the rules database, the A1 algorithm function may insert the record in the database as a new state transition rule. Otherwise, at 520, if the record is already present in the rules database, the A1 algorithm function may discard the record.

As noted, the discovery mode function for embodiments of the invention may receive the ATM security agent function data feed as an input and produce a rules database record as output. The task of the discovery mode function may be to wrangle or format the incoming ATM security agent function data feed and analyze the wrangled data feed for data integrity by processing it through a set of common checks for logical correctness of the data. If the wrangled data feed passes such checks, the discovery mode function may then check whether or not the rules database already has a corresponding record. If so, no further action is taken regarding the wrangled data, but if not, the discovery algorithm output becomes a new rules database record. In either case, no response of any kind is sent by the discovery mode function to the ATM security agent function.

For example, assume that the discovery mode function of ATM security algorithm for embodiments of the invention receives a data feed from the ATM security agent function, such as illustrated in the example of FIG. 3. In such case, the discovery mode function for embodiments of the invention may first check all elements of the data feed, for example, for data type and size thresholds. For example, a value for 'Network Available' 306 may only be Boolean, such as 'Yes' or 'No', and a value for 'Customer Request Amount' 308 may only be numerical and must fall between $1 and $1000 based, for example, on a daily withdrawal limit.

Once the discovery mode function algorithm for embodiments of the invention completes the data integrity check, the algorithm A1 function may check further for logical correctness of the data in the data feed. For example, assume the 'Customer Request Amount' 308 is $200. If the Bank Host Authorized Amount is only $100 based, for example, on a daily withdrawal limit or a balance available in the account, the difference between the 'Cash Counter Previous State' and the 'Cash Counter Current State' may be only $100 ($100×30 minus $100×29) instead of $200 ($100×30 minus $100×28) as shown in the example of FIG. 3.

If the data feed crosses this state, the discovery algorithm for embodiments of the invention may generate a rules database record, such as:

| Current State | Next State |
|---|---|
| Cash Counted | Present Cash |

A query of the rules database may be as follows:
[{
"currentstate": "cash counted",
"nextstate": "present cash"
}]

If not already found in the rules database, it may be inserted in the rules database as a record in a whitelist of safe ATM transition states in the rules database.

The algorithm function A1 for embodiments may be characterized as a data analysis function that does not prevent a transaction from occurring. Even though, while the algorithm A1 function is learning, it may determine that there is a security issue with a transaction, it will not stop the transaction. Instead, an algorithm A2 protection phase function for embodiments of the invention may be employed for that purpose.

In the protection phase for embodiments of the invention, the algorithm A2 function may also use the model to check data for logical integrity and may access the document database to determine whether or not a transaction should be rejected. For example, in the protection phase the algorithm A2 function may check the self-learning document database to determine what the ATM may have learned up to the current time in order to assure ATM security in both hardware and software events.

That is true for any hardware or software event that occurs on the ATM. Thus, any ATM event, such as an opening of the ATM door, an attempted manipulation of the ATM PIN pad, or an insertion of a fraudulent card in the ATM card reader may be captured and recognized via the integrity checks and the self-learning document database for embodiments of the invention.

Figure 6:
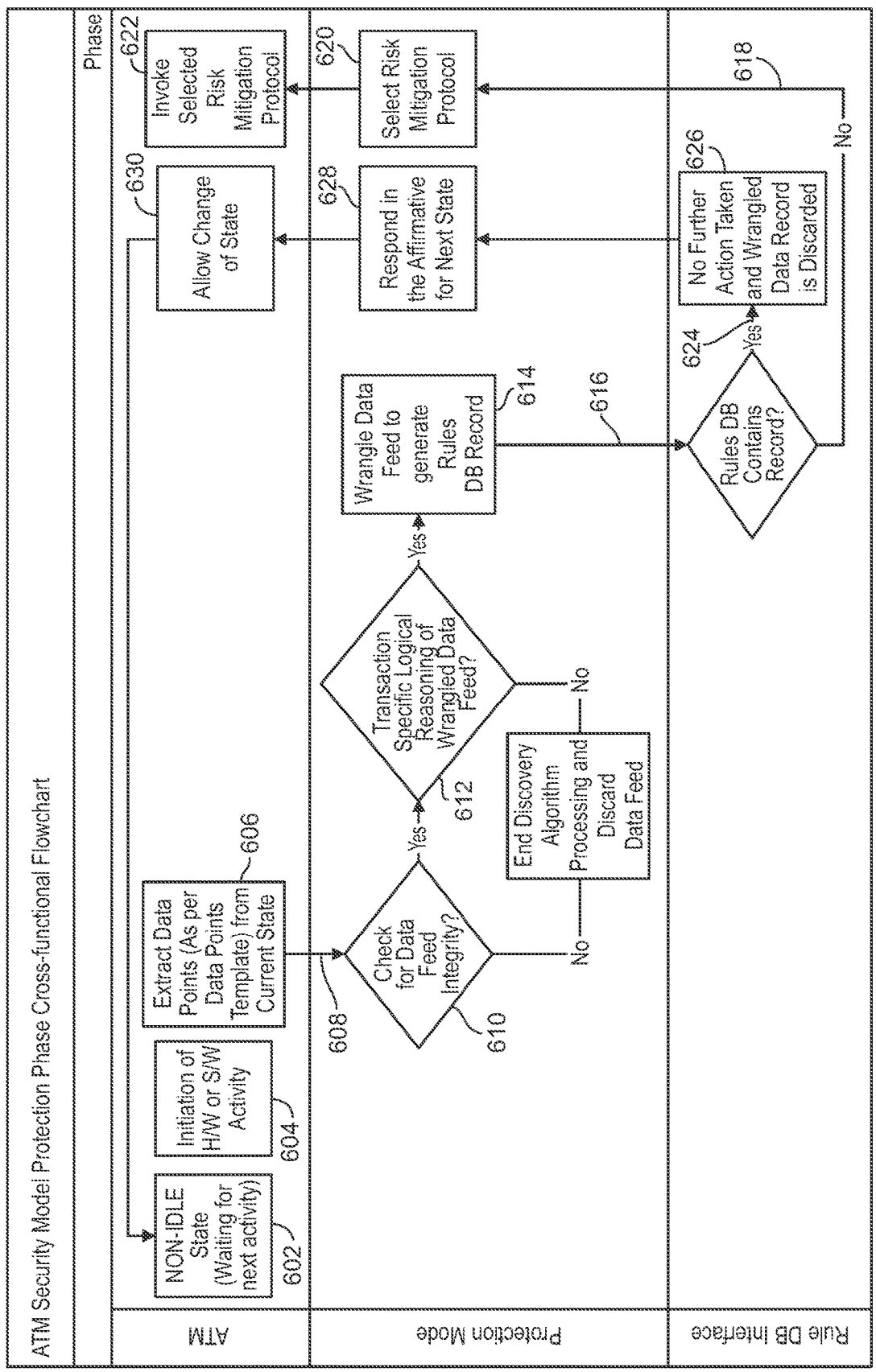
FIG. 6 illustrates a use case example of an ATM model protection phase cross-functional flow chart for embodiments of the invention.

FIG. 6 illustrates a use case example of an ATM model protection phase cross-functional flow chart for embodiments of the invention. Referring to FIG. 6, at 602, an ATM may be in a known initial state or start node in which it awaits an occurrence of hardware or software activity for an ATM session, which may be initiated as an ensuing state at 604. At 606, upon encountering hardware or software activity in an ensuing state, the ATM security agent function may extract transaction specific data points from a current state of the session based, for example, on a data points template and feed the data points as input to the A2 algorithm function at 608.

Referring further to FIG. 6, at 610, the A2 algorithm function may check the received data points feed for data integrity; at 612, the A2 algorithm function may check the data points feed for logical correctness; at 614, the A2 algorithm function may wrangle the data feed into a rules database record; and at 616, the A2 algorithm function may query the rules database as to whether or not the record from the current state of the ATM to the ensuing state is present in the database to identify whether or not such transition is a positive or negative flow.

Referring again to FIG. 6, at 618, if the record is not present in the rules database, the A2 algorithm function may identify a threat based the absence of the transition from the current state of the ATM to the ensuing state in the rules database; at 620, the A2 algorithm function may select a risk mitigation protocol; and the selected risk mitigation protocol may by invoked by the ATM at 622. Otherwise, at 624, if the record is already present in the rules database, the A2 algorithm function may discard the record at 626. In addition, at 628, the A2 algorithm function may respond in the affirmative for the next state; and the ATM may allow the change of state at 630.

As in the discovery mode, the protection mode function algorithm for embodiments of the invention may receive an ATM security agent function feed as an input and generate a rules database record as output. The task of the protection mode function algorithm is to wrangle or format the incoming ATM security agent function data feed and analyze the wrangled data feed by processing it through a set of common checks that identify a correctness of the data. However, the protection mode function algorithm function is not capable of inserting the record into the rules database.

Instead, the protection mode function for embodiments of the invention makes a direct check on the data present in the data feed against the rules database for existing records of the same data points. If a match is found, the protection mode function of the algorithm may respond positively to the ATM security agent function. If not, the protection mode function of the algorithm may respond negatively to the ATM security agent function. Based on a positive or negative response, the ATM security agent function may accept or reject the transition of current ATM State to the ensuing state.

In embodiments of the invention, if the data correctness check fails, the transition of state is rejected outright by the protection mode function of the algorithm, which may send a negative response to the ATM security agent function. At this point, the protection mode function of the algorithm may proceed in the same way as the discovery mode function of the algorithm with the exception of the outcome of the rules database query:

[{
  "currentstate": "cash counted",
  "nextstate": "present cash"
}]

If outcome of the rules database query by the A2 algorithm function is positive, meaning that the record is found and exists in the whitelist of safe ATM transition states, the transition may be allowed. If the transition state is not found in the whitelist of safe ATM transition states, it may be rejected or halted, or an appropriate risk mitigation protocol may be invoked. It is to be understood that it is not necessary for the ATM security algorithm function to be run in a single mode but that the security algorithm function may be capable of running in both discovery and protection modes to achieve true learning while protecting the ATM.

The rules database for embodiments of the invention is a document database that stores only positive transitions of ATM states or cases that are possible as part of ATM state transitions. This is true because, as part of the discovery phase, the ATM learns only positive cases and does not learn negative cases. The ATM algorithm discovery mode function may whitelist only records of positive cases, and anything that falls outside the whitelist is automatically considered as blacklist. Thus, the whitelist represents positive state transitions, while the blacklist represents negative state transitions, and anything that is not positive is automatically considered to be negative by the ATM. The rules database for embodiments of the invention may expand only during the discovery phase and not during the protection phase, provided both phases are not active at the same time.

Figure 7:
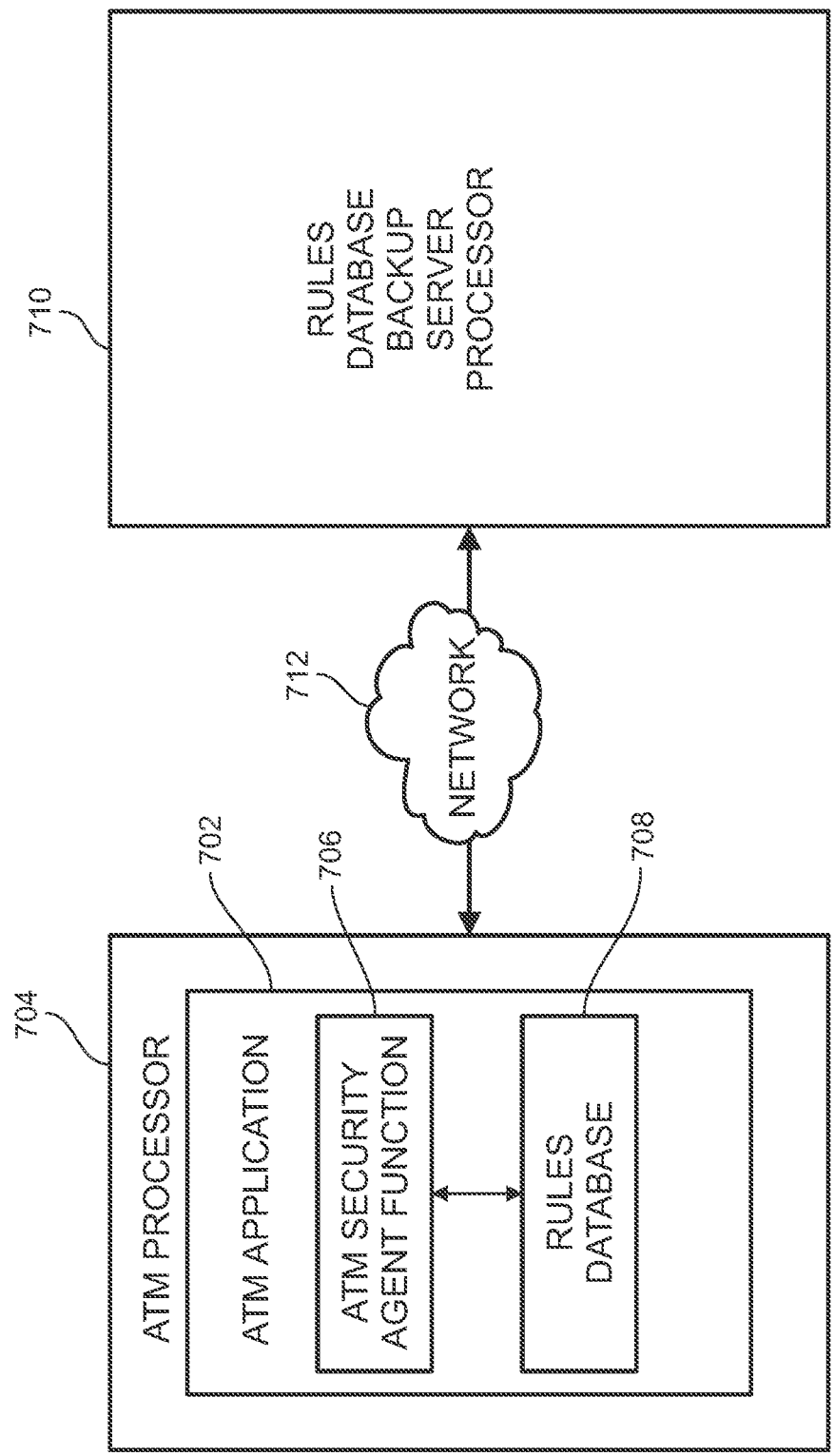
FIG. 7 is a schematic diagram that illustrates example components and flow of information between components for embodiments of the invention.

FIG. 7 is a schematic diagram that illustrates example components and flow of information between components for embodiments of the invention. As noted, an ATM application 702 may run on the ATM processor 704, and the ATM security agent function 706, including discovery and security algorithm functions, and the rules database 708, may also run on the ATM processor. Referring to FIG. 7, the rules database 708 may be easily backed-up and stored elsewhere, such as on a rules backup server 710, via a network 712 once the discovery phase is completed. As a result, when a hard drive of the ATM is swapped, the rules database can be restored onto the ATM through an ATM network without loss in the ATM security agent function operation. A example of what a rules database for embodiment of the invention may contain is as follow:

| Document Table | |
|---|---|
| Current State | Next State |
| Cash Counted | Present Cash |
| Pin Entered | Select Options |
| Cash Collected | Display New Balance |

Although shown here as a Structured Query Language (SQL) table for storage, in real time, the document table may directly store JavaScript Object Notations (JSONs) as used in the query. Thus, the query request may directly match and remove intermediate processing. Embodiments of the invention may employ Non-SQL (NoSQL) document-oriented databases, which are the fastest available in the industry.

Based on current knowledge, there is no product currently available in the market that employs machine learning to prevent a security incident from occurring.

Embodiments of the invention may be deployed with minimal cost and may also be reusable. Regarding reusability, the self-learning document database 708 may provide a record of all transactions that occur on an ATM. When an ATM shuts down, the algorithm A1 function may not perform any action other than a request to re-start the ATM in order to continue to self-learn. After a period, such as one or two months after re-starting the ATM, the algorithm A1 function may again commence its focus on whether or not the ATM is behaving properly.

Referring to FIG. 7, unlike currently available legacy ATM security solutions, the software such as the ATM security agent function 706 for embodiments of the invention, may run on the (CPU) 704 of the ATM, and the document database 708 for embodiments of the invention may also run on the ATM. Thus, embodiments of the invention enable the ATM to self-learn without requiring, for example, external software and/or other external resources. Regarding reusability, in embodiments of the invention, a document database of a particular ATM that has undergone self-learning that is deemed sufficient, may be deployed to another ATM, for example, via a network 712, such as the ATM network. Further, the algorithm and/or the model for embodiments of the invention may be changed from time-to-time, and the document database may be restored from a backup database 710 from time-to-time.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein. The present invention may be a system, a method, and/or a computer program product at any possible technical detail level of integration. The computer program product may include a computer readable storage medium (or media) having computer readable program instructions thereon for causing a processor to carry out aspects of the present invention.

It is to be understood that embodiments of the invention may be implemented as processes of a computer program product, each process of which is operable on one or more processors either alone on a single physical platform or across a plurality of platforms, such as a system or network, including networks such as the Internet, an intranet, a WAN, a LAN, a cellular network, or any other suitable network. Embodiments of the invention may employ client devices that may each comprise a computer-readable medium, including but not limited to, random access memory (RAM) coupled to a processor. The processor may execute computer-executable program instructions stored in memory. Such processors may include, but are not limited to, a microprocessor, an application specific integrated circuit (ASIC), and/or state machines. Such processors may comprise, or may be in communication with, media, such as computer-readable media, which stores instructions that, when executed by the processor, cause the processor to perform one or more of the steps described herein.

It is also to be understood that such computer-readable media may include, but are not limited to, electronic, optical, magnetic, RFID, or other storage or transmission device capable of providing a processor with computer-readable instructions. Other examples of suitable media include, but are not limited to, CD-ROM, DVD, magnetic disk, memory chip, ROM, RAM, ASIC, a configured processor, optical media, magnetic media, or any other suitable medium from which a computer processor can read instructions. Embodiments of the invention may employ other forms of such computer-readable media to transmit or carry instructions to a computer, including a router, private or public network, or other transmission device or channel, both wired or wireless. Such instructions may comprise code from any suitable computer programming language including, without limitation, C, C++, C#, Visual Basic, Java, Python, Perl, and JavaScript.

It is to be further understood that client devices that may be employed by embodiments of the invention may also comprise a number of external or internal devices, such as a mouse, a CD-ROM, DVD, keyboard, display, or other input or output devices. In general such client devices may be any suitable type of processor-based platform that is connected to a network and that interacts with one or more application programs and may operate on any suitable operating system. Server devices may also be coupled to the network and, similarly to client devices, such server devices may comprise a processor coupled to a computer-readable medium, such as a random access memory (RAM). Such server devices, which may be a single computer system, may also be implemented as a network of computer processors. Examples of such server devices are servers, mainframe computers, networked computers, a processor-based device, and similar types of systems and devices.

Aspects of the present invention may be described herein with reference to flowchart illustrations and/or block diagrams of methods, apparatus (systems), and computer program products according to embodiments of the invention. It will be understood that each block of such flowchart illustrations and/or block diagrams, and combinations of blocks in the flowchart illustrations and/or block diagrams, may be implemented by computer readable program instructions. These computer readable program instructions may be provided to a processor of a special purpose computer or other programmable data processing apparatus to produce a machine, such that the instructions, which execute via the processor of the computer or other programmable data processing apparatus, create means for implementing the functions/acts specified in the flowchart and/or block diagram block or blocks.

These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions may also be loaded onto a computer, other programmable data processing apparatus, or other device to cause a series of operational steps to be performed on the computer, other programmable apparatus or other device to produce a computer-implemented process, such that the instructions which execute on the computer, other programmable apparatus, or other device implement the functions/acts specified in the flowchart and/or block diagram block or blocks.

The flowchart and block diagrams in the Figures may illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A system, comprising:
    a storage device located locally in an automated teller machine (ATM); and
    an ATM processor located locally in the ATM, coupled to the ATM storage device, and operating locally on the ATM, wherein the ATM processor, without communicating with an external device, executes application code instructions that are stored in the storage device to cause the system to:
        create a self-learning rules system operating on the ATM processor by:
            storing, without communicating with an external device, on a rules database on the ATM storage device a rules database record for only a single instance of a positive transition flow from a current state to an ensuing state for each of a plurality of ATM hardware or software activities initiated by the ATM processor;
            storing, without communicating with an external device, on the ATM storage device a collection of positive transition flows from current states to ensuing states, the collection forming a path;
            extracting, without communicating with an external device, data points from a transition flow from a current state to an ensuing state for a succeeding ATM hardware or software activity initiated by the ATM processor;
            generating, without communicating with an external device, a rules database record for the transition flow from the current state to the ensuing state for the succeeding ATM hardware or software activity initiated by the ATM processor based on said extracted data points; and
            discarding, without communicating with an external device, said generated rules database record when said generated rules database record is identical to a rules database record already stored on the rules database on the ATM storage device;
            generating, without communicating with an external device, a model of transactions based on data learned from the stored rules database, the model being suitable to discover whether or not a particular transition from one event to another is a legitimate transition when a particular rules database record is compared to the model;
            storing, without communicating with an external device, on the storage device the model;
            determining, without communicating with an external device, from a first collection of data points from a first set of transition flows from current states to ensuing states, that the first collection forms a path that leads to a threat; and
            determining, without communicating with an external device, from a second collection of data points from a second set of transition flows from current states to ensuing states, that the second collection forms a path that does not lead to a threat;
        operate the self-learning rules system operating on the ATM processor by:
            determining in real time and without communicating with an external device, based on data points from a first subsequent set of transition flows from current states to ensuing states for a first subsequent ATM hardware or software activity initiated by the ATM processor, whether the set of transitions for the first subsequent ATM hardware or software activity was following a path that leads to a threat or was following a path that does not lead to a threat;
            based on a determination that the first subsequent ATM hardware or software activity was following the path that leads to the threat, ending the first subsequent ATM hardware or software activity without communicating with an external device; and
            dynamically, in real time and without communicating with an external device, changing the model based on data learned from the second collection of data points from the second set of transition flows, the changing of the model being performed without a communication with an external device;
            receiving, without communicating with an external device, data points from a second subsequent set of transition flows from current states to ensuing states for a second subsequent ATM hardware or software activity initiated by the ATM processor; and
            comparing, without communicating with an external device since the changing of the model, the received data points to the changed model to determine if the second subsequent ATM hardware or software activity was following the path that leads to a threat.

2. The system of claim 1, wherein said rules database function of the ATM processor further comprises a document database function of the ATM processor.

3. The system of claim 1, wherein the application code instructions further cause the system to store the rules database record for only the single instance of positive transition flow from the current state to the ensuing state as a state transition rule record for each of the plurality of ATM hardware or software activities initiated by the ATM processor.

4. The system of claim 3, wherein the application code instructions further cause the system to store the database record as a state transition rule record in a whitelist of safe ATM transition states for each of the plurality of ATM hardware or software activities initiated by the ATM processor.

5. The system of claim 1, wherein the application code instructions further cause the system to extract data points from the transition flow from the current state to the ensuing state for every succeeding ATM hardware or software activity initiated by the ATM processor based on a data points template.

6. The system of claim 1, wherein the application code instructions further cause the system to output the extracted data points as an input to the ATM processor.

7. The system of claim 1, wherein the application code instructions further cause the system to receive the extracted data points from the security agent function of the ATM and formats and analyzes the extracted data points for data integrity.

8. The system of claim 7, wherein the application code instructions further cause the system to receive the extracted data points from the security agent function of the ATM and formats and analyzes the extracted data points for data integrity based on a model template for logical correctness of the extracted data.

9. The system of claim 1, wherein the application code instructions further cause the system to generate the database record for the transition flow from the current state to the ensuing state for every succeeding ATM hardware or software activity initiated by the ATM processor based on said extracted data points, and outputs said generated database record as a new rules database record when said generated database record is not identical to a rules database record already stored by the rules database function of the ATM processor.

10. The system of claim 9, wherein the application code instructions further cause the system to generate the rules database record for the transition flow from the current state to the ensuing state for every succeeding ATM hardware or software activity initiated by the ATM processor based on said extracted data points, and stores said generated rules database record as a new rules database record on the rules database function of the ATM processor when said generated rules database record is not identical to a rules database record already stored by the database function of the ATM processor.

11. The system of claim 1, wherein the application code instructions further cause the system to generate the rules database record for the transition flow from the current state to the ensuing state for every succeeding ATM hardware or software activity initiated by the ATM processor based on said extracted data points, and sends a negative transition response to the ATM processor when said generated rules database record is not identical to a rules database record already stored by the rules database function of the ATM processor.

12. The system of claim 11, wherein the application code instructions further cause the system to generate the rules database record for the transition flow from the current state to the ensuing state for every succeeding ATM hardware or software activity initiated by the ATM processor based on said extracted data points, and selects a security risk mitigation protocol when said generated rules database record is not identical to a rules database record already stored by the rules database function of the ATM processor.

13. A computer-implemented method, comprising:
create a self-learning rules system operating on the ATM processor by:
storing, by a rules database function of an automated teller machine (ATM) processor operating locally on an ATM without external software or external resources, a rules database record for only a single instance of a positive transition flow from a current state to an ensuing state for each of a plurality of ATM hardware or software activities initiated by the ATM processor;
extracting, by a security agent function of the ATM processor, data points from a transition flow from a current state to an ensuing state for every succeeding ATM hardware or software activity initiated by the ATM processor;
generating, by an algorithm function of the ATM processor, a rules database record for the transition flow from the current state to the ensuing state for every succeeding ATM hardware or software activity initiated by the ATM processor based on said extracted data points;
discarding, by the algorithm function of the ATM processor, said generated rules database record when said generated rules database record is identical to a rules database record already stored on the rules database function of the ATM processor;
storing, by the algorithm function of the ATM processor, on the storage device a model of transactions based on the stored rules database, the model being suitable to discover whether or not a particular transition from one event to another is a legitimate transition when a particular rules database record is compared to the model;
determining, by the algorithm function of the ATM processor, from a first collection data points from a first set of transition flows from current states to ensuing states, that the first collection forms a path that leads to a threat; and
determining, by the algorithm function of the ATM processor, from a second collection of data points from a second set of transition flows from current states to ensuing states, that the second collection forms a path that does not lead to a threat; and
operate the self-learning rules system operating on the ATM processor by:
determining, by the security agent function of the ATM processor and based on data points from a subsequent set of transition flows from current states to ensuing states for a subsequent ATM hardware or software activity initiated by the ATM processor, whether the set of transitions for the subsequent ATM hardware or software activity was following a path that leads to a threat or was following a path that does not lead to a threat;
based on a determination that the subsequent ATM hardware or software activity was following the path that does not lead to the threat, proceeding, by the security agent function of the ATM processor, with the subsequent ATM hardware or software activity;
dynamically changing, by the algorithm function of the ATM processor, the model based on the second collection of data points from the second set of transition flows, the changing of the model being performed without a communication with an external device; and
receiving, by the security agent function of the ATM processor, data points from a second subsequent set of transition flows from current states to ensuing states for a second subsequent ATM hardware or software activity initiated by the ATM processor; and
comparing, by the security agent function of the ATM processor, the received data points to the changed model to determine if the second subsequent ATM hardware or software activity was following the path that leads to a threat.

14. The method of claim 13, wherein storing the rules database record by the database function of the ATM processor further comprises storing the rules database record by a document database function of the ATM processor.

15. The method of claim 13, wherein storing the rules database record by the database function of the ATM processor further comprises storing the rules database record for only the single instance of positive transition flow from the current state to the ensuing state as a state transition rule record for each of the plurality of ATM hardware or software activities initiated by the ATM processor.

16. The method of claim 15, wherein storing the rules database record by the database function of the ATM processor further comprises storing the database record as the state transition rule record in a whitelist of safe ATM transition states for each of the plurality of ATM hardware or software activities initiated by the ATM processor.

17. The method of claim 13, wherein extracting data points from the transition flow by the security agent function of the ATM processor further comprises extracting the data points from the transition flow from the current state to the ensuing state for every succeeding ATM hardware or software activity initiated by the ATM processor based on a data points template.

18. The method of claim 13, wherein extracting data points from the transition flow by the security agent function of the ATM processor further comprises outputting the extracted data points as an input to the algorithm function of the ATM processor.

19. The method of claim 13, wherein generating the rules database record by the algorithm function of the ATM processor further comprises receiving the extracted data points from the security agent function of the ATM, and formatting and analyzing the extracted data points for data integrity.

20. The method of claim 19, wherein formatting and analyzing the extracted data points further comprises formatting and analyzing the extracted data points for data integrity based on a model template for logical correctness of the extracted data.

21. The method of claim 13, wherein generating the rules database record by the algorithm function of the ATM processor further comprises generating, by a discovery phase algorithm function of the ATM processor, the rules database record for the transition flow from the current state to the ensuing state for every succeeding ATM hardware or software activity initiated by the ATM processor based on said extracted data points, and outputting, by said discovery phase algorithm function of the ATM processor, said generated rules database record as a new rules database record when said generated database record is not identical to a rules database record already stored by the rules database function of the ATM processor.

22. The method of claim 21, wherein outputting the generated rules database record as a new rules database record by the discovery phase algorithm function of the ATM processor further comprises storing said new rules database record on the rules database function of the ATM processor when said generated rules database record is not identical to a rules database record already stored by the database function of the ATM processor.

23. The method of claim 13, wherein generating the rules database record by the algorithm function of the ATM processor further comprises generating, by a protection phase algorithm function of the ATM processor, the rules database record for the transition flow from the current state to the ensuing state for every succeeding ATM hardware or software activity initiated by the ATM processor based on said extracted data points, and sending, by the protection phase algorithm function of the ATM processor, a negative transition response to the security agent function of the ATM processor when said generated rules database record is not identical to a rules database record already stored by the rules database function of the ATM processor.

24. The method of claim 23, wherein generating the rules database record by the protection phase algorithm function of the ATM processor further comprises generating the rules database record for the transition flow from the current state to the ensuing state for every succeeding ATM hardware or software activity initiated by the ATM processor based on said extracted data points, and selecting a security risk mitigation protocol when said generated rules database record is not identical to a rules database record already stored by the rules database function of the ATM processor.

* * * * *